[54] ADJUSTABLE PINCUSHION CORRECTION CIRCUIT

[75] Inventor: Richard L. Wilocki, Elk Grove, Ill.

[73] Assignee: Warwick Electronics Inc., Chicago, Ill.

[22] Filed: Feb. 27, 1974

[21] Appl. No.: 446,321

[52] U.S. Cl. ................. 315/400; 315/370; 315/371
[51] Int. Cl.² ..................... H01J 29/70; H01J 29/76
[58] Field of Search..................... 315/400, 370, 371

[56] References Cited
UNITED STATES PATENTS

| | | | |
|---|---|---|---|
| 3,452,243 | 6/1969 | Knorr | 315/371 |
| 3,681,725 | 8/1972 | Ikeuchi | 315/370 |
| 3,748,531 | 7/1973 | Boekhorst | 315/400 |
| 3,814,982 | 6/1974 | Sakurai | 315/371 |

Primary Examiner—Maynard R. Wilbur
Assistant Examiner—T. M. Blum
Attorney, Agent, or Firm—Wegner, Stellman, McCord, Wiles & Wood

[57] ABSTRACT

In a television receiver, a saturable transformer has three windings, one being in series with a horizontal deflection coil to introduce a parabolic reactance variation to correct for side pincushion distortion. An adjustable correction circuit includes a transistor integrator for producing in another winding of the saturable transformer a vertical parabolic current. The last winding of the saturable transformer is coupled through a pair of switching diodes to a pair of variable inductors. The diodes conduct alternately at the beginning and end of the vertical scanning period. The variable inductors may be mounted coaxially with a common movable core to allow inverse side correction, or may be mounted separately with separate movable cores to allow independent side correction.

12 Claims, 6 Drawing Figures

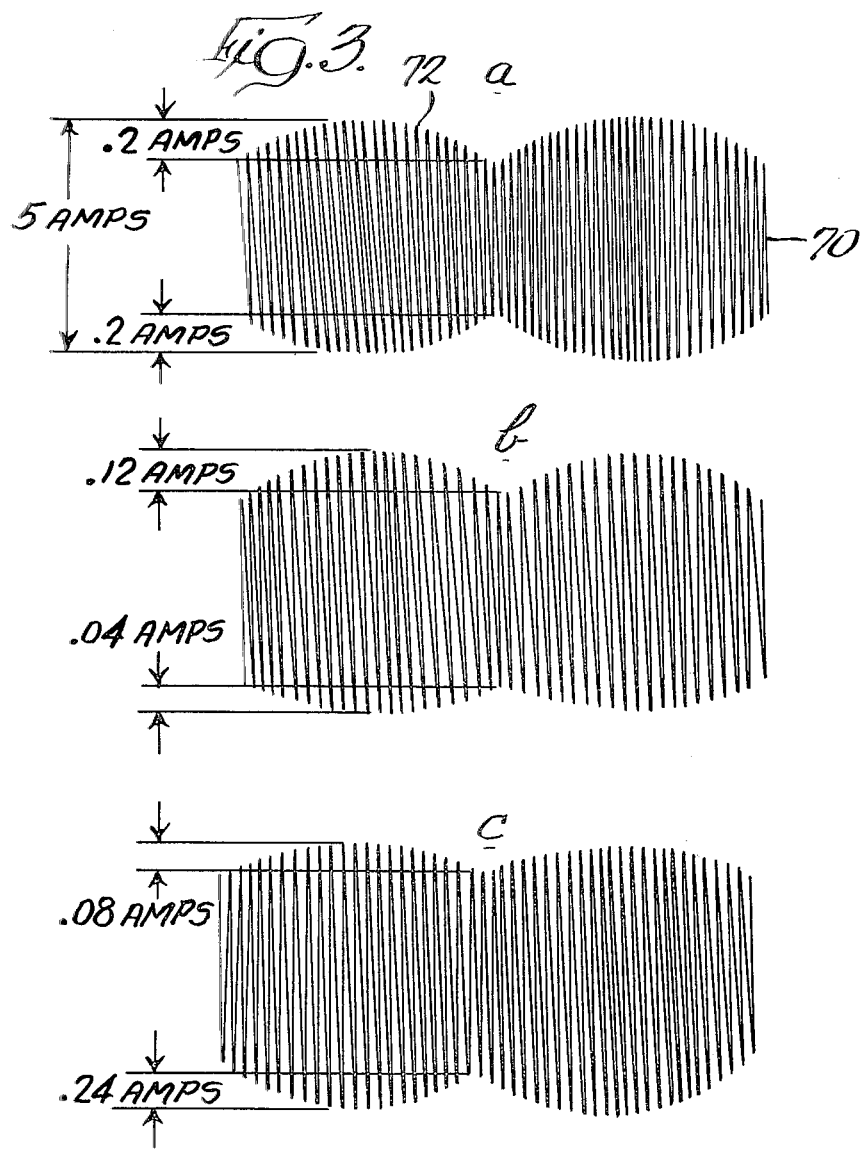
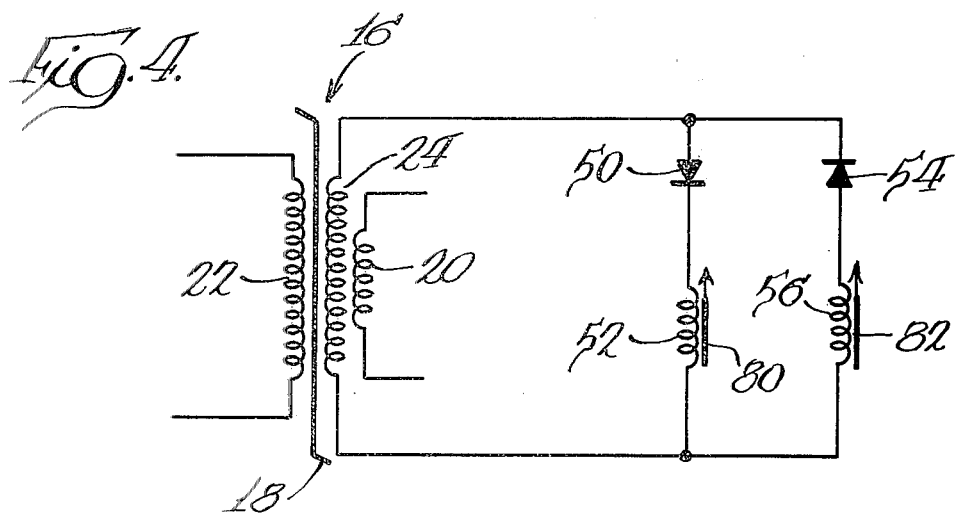

ADJUSTABLE PINCUSHION CORRECTION CIRCUIT

BACKGROUND OF THE INVENTION

This invention relates to a pincushion correction circuit having adjustable control over the amount of pincushion correction.

Pincushion raster distortion can be corrected by using a saturable reactor or transformer to generate a variable reactance having a parabolic shape. In many circuits, a winding of the saturable transformer is placed in series with one of the deflection coils to modulate the deflection current with a parabolic signal derived from the deflection signal for the other deflection coil. When east-west or side pincushion distortion is being corrected, horizontal drive current to the horizontal drive coil is modulated with a vertical parabolic signal. In a saturable reactor type pincushion correction circuit, some degree of variable adjustment has been possible, as shown for example in Lempke U.S. Pat. No. 3,329,859, Barkow et al. U.S. Pat. No. 3,329,861 and Lempke U.S. Pat. No. 3,329,862.

Pincushion correction circuits have also been developed which do not use a saturable reactor or transformer but rather depend on a different type of circuit to introduce a parabolic curve to the deflection waveform. For example, an integrator may be used to produce a parabolic waveform which is inductively coupled through a nonsaturable transformer to superimpose the correction current on the deflection signal, as shown for example in Knorr U.S. Pat. No. 3,452,243.

The amount of pincushion correction necessary at the beginning and end of scan may be unequal. In side pincushion distortion, the amount of curvature or bowing at the "east" side of the raster may be different than the amount of bowing at the "west" side of the raster. In some cases, the amount of bowing may be inversely proportional, but in other cases, the amount of bowing may not be related. In prior pincushion correction circuits using a saturable reactor, separate and/or independent adjustment of the amount of correction at the beginning and end of trace has not been possible, or has required unduly complex circuitry.

SUMMARY OF THE INVENTION

In accordance with the present invention, a pincushion correction circuit using a saturable reactor provides separate correction adjustment at the beginning and end of scan. The circuit is straight-forward, and if desired, provides a single adjustment control to inversely adjust the correction at the beginning and end of scan. Or, a pair of independent controls can be provided to allow separate adjustment of the correction at the beginning and end of scan. The adjustments are provided by a variable inductor having a movable core. A diode switching network switches the correction current to the particular variable inductor which is to control adjustment at beginning or end of scan.

One object of the present invention is the provision of a pincushion distortion correction circuit having adjustment over the beginning portion and end portion of scan and using a saturable transformer. A pair of variable inductors are each coupled to separate diodes for switching correction current between the variable inductors in order to allow separate control of adjustment at the beginning portion and end portion of scan.

Other features and advantages of the invention will be apparent from the following description and from the drawings. While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

BRIEF DESCRIPTION OF THE DRAWINGS

FIGS. 3a–3c are waveform diagrams illustrating the horizontal deflection current coupled to the horizontal yoke when modulated with a parabolic correction signal at the vertical scanning rate; and FIG. 4 is a partial schematic diagram of a modification to the circuit of FIG. 1.

DESCRIPTION OF THE PREFERRED EMBODIMENT

Figure 1:
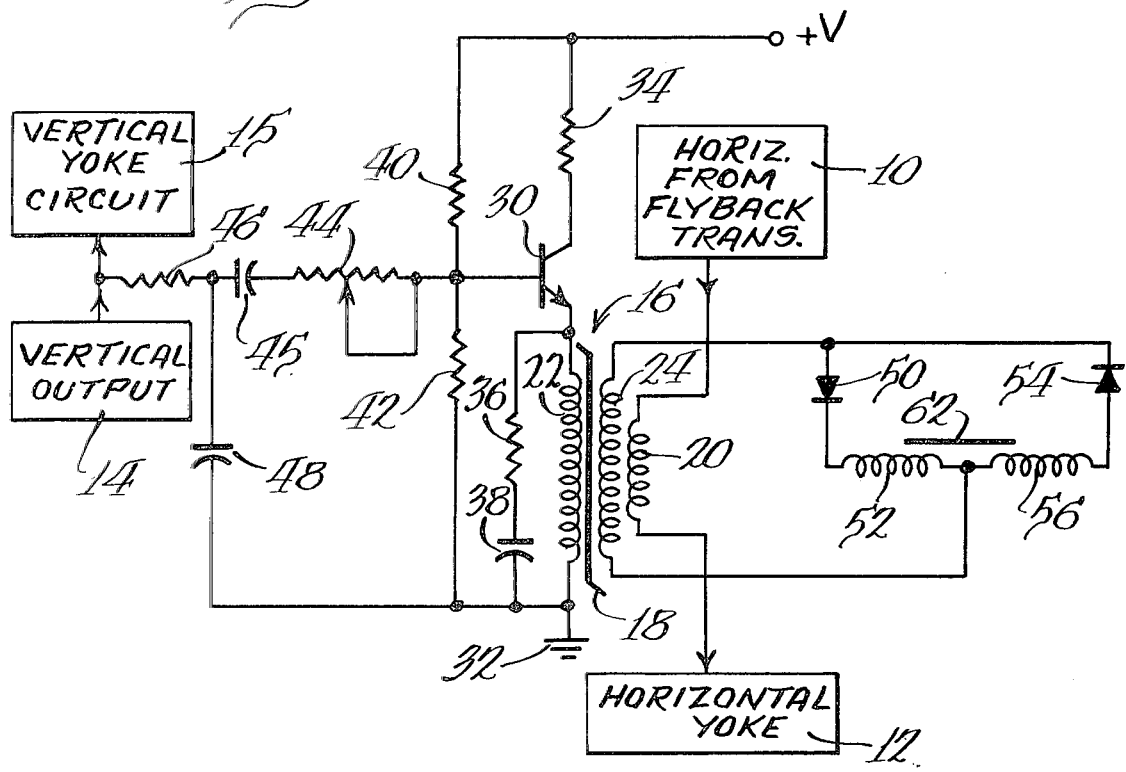
FIG. 1 is a schematic diagram of the adjustable pincushion distortion correction circuit.

Turning to FIG. 1, a side pincushion correction circuit is illustrated for use in a conventional television receiver having a sweep source 10 of horizontal sawtooth deflection current, such source being for example the conventional flyback transformer of the television receiver. The deflection current is coupled to a horizontal yoke or deflection coil 12 to produce a horizontal line or scan in a cathode ray tube. A sweep source 14 of vertical scanning current, available for example from the vertical output stage of the television receiver, provides vertical sawtooth deflection current for driving a vertical yoke circuit 15. The combination of the horizontal scan and the vertical scan produces a two dimensional raster on the television cathode ray tube.

To correct for side pincushion distortion, it is necessary to progressively increase the amplitude of the horizontal scan signals as the electron beam approaches the middle of the vertical raster, and then to progressively decrease the amplitude of the horizontal scan signals as the beam approaches the lower portion of the vertical raster. The applicant's correction circuit includes a saturable reactor or saturable transformer 16 which includes a saturable magnetic core 18 forming a two window circuit defined by three core legs. Around the center core leg is wound a control winding 22 which may be formed by 1200 turns of No. 38 wire. An equalizing winding 24 is wound on the outer core legs and is formed by 38 turns of No. 32 wire. A winding 20 is wound over winding 24 and is formed by 24 turns of No. 27 wire, and is connected in series aiding relation with respect to winding 24. Winding 20 is coupled by a deflection circuit in series between the horizontal sawtooth current sweep source 10 and the horizontal yoke coil 12.

An adjustable correction means includes a transistor integrator for developing a parabolic voltage which is coupled to control winding 22 to saturate the core at the center of the vertical sweep or peak of the parabolic voltage. More particularly, a drive transistor 30 has its emitter or output coupled through control winding 22 to a source of reference potential or ground 32. The collector output of transistor 30 is coupled through a load resistor 34 to a source of positive DC potential or +V. Control winding 22 is shunted by RC network consisting of a resistor 36 and a series connector capacitor 38. The base of drive transistor 30 is connected to a biasing network including a pair voltage divider resistors 40 and 42 connected in series between +V and ground 32. The base is also coupled through a variable resistor 44 for varying the amplitude of the integrated sawtooth signal, a capacitor 45, and a resistor 46 to the vertical output stage 14. A capacitor shunts the junction between resistor 46 and capacitor 45 to ground 32. The vertical sawtooth current from source 14 is integrated to produce the parabolic voltage which is coupled to control winding 22 of the saturable transformer 16.

Winding 20 presents an impedance in series with the horizontal yoke and the impedance varies with the parabolic waveform (and is a minimum when the core 18 is saturated). The horizontal yoke current modulation, although equal at start and end of scan, produces unequal side pincushion correction. An equalizer circuit eliminates this effect by varying the amount of modulation at start and end of horizontal sweep. The equalizing winding 24 of the saturable transformer is shunted by a first switching diode 50 and a first adjustment choke or variable inductor 52. A second circuit shunts the first circuit and includes a second switching diode 54 and a second adjustment choke or variable inductor 56.

Figure 2:
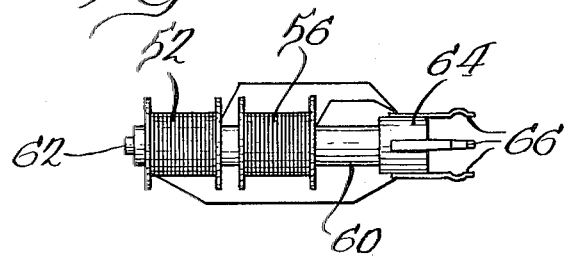
FIG. 2 is a side plan view of the pair of coaxially mounted variable inductors shown in FIG. 1.

In the first embodiment of the invention, FIGS. 1–3, variable inductors 52 and 56 each are 800 micro-henries (without the core) and are mounted coaxially on bobbins located on a hollow cylindrical coil form or sleeve 60, see FIG. 2. A single or common iron core 62 is movable inside the hollow cylindrical sleeve 60 in order to inversely change the inductance of windings 52 and 56. The cylindrical sleeve 60 terminates in a mounting base 64 which carries a plurality of metal connectors 66 for inserting the coil form assembly into the circuit.

The operation of the side pincushion correction circuit will now be explained with reference to FIGS. 3a–3c which illustrates the modulated horizontal current which is passed through winding 20 to the horizontal yoke coil 12. Two vertical scan frames are shown. When the core 62 is located equally between variable inductors 52 and 56, the inductance of both coils is equal and produces the modulated waveform shown in FIG. 3a.

At the start of horizontal scan current, diode 54 conducts through the impedance of choke the parabolic vertical scan current produced in winding 24. The current produced by the parabolic voltage in winding 22 saturates the saturable core 18 at the center of the vertical sweep or peak of the parabolic voltage. As a result, the horizontal sawtooth current 70 is modulated by the integrated vertical sawtooth to produce a parabolic envelope 72 which has a bulge at the center of the raster and minimums or valleys at the start and end of each vertical sweep period.

As the core 62 is moved closer toward winding 52, its inductance increases and the inductance of winding 56 decreases in an inverse manner. The inductive reactance of windings 52 and 56, when switched into the circuit by conduction of the associated diodes 50 and 54, is reflected into winding 20. This reflected impedance will appear in winding 20 as a capacitive reactance, tending to reduce the inductive reactance of winding 20. Since the amount of correction is proportional to the value of the reactance of winding 20, it can be seen that the amount of correction is determined by the inductive reactance values of inductors 52 and 56.

With inductor 56 set for maximum inductance, the reflected impedance will be minimum, and therefore, more correction will occur at the start of scan (right side of raster). The impedance of inductor 52 will be at a minimum, and less correction will occur at the end of scan (left side of raster). When the impedance of inductors 52 and 56 is reversed, the sides of more and less correction are correspondingly reversed. When inductor 52 is at a maximum and inductor 56 is at a minimum, the current waveform of FIG. 3b will occur. Conversely, when inductor 52 is at a minimum and inductor 56 is at a maximum, the horizontal yoke current will be modulated as seen in FIG. 3c.

If desired, separate and independent adjustment for each side of the raster can be provided by winding the inductors 52 and 56 on separate coil forms, as illustrated in FIG. 4. The remaining portion of the circuit is the same as illustrated in FIG. 1. In particular, a movable core 80 is associated with winding 52, and a separate and independent movable core 82 is associated with winding 56. With a constant parabolic correction current applied to control winding 22, the movable core 80 of winding 56 may be adjusted to provide the desired amount of side correction at the end of scan. Conversely, the movable core 82 of winding 56 may be adjusted to provide the desired amount of side correction at the start of scan.

Having described the invention, the embodiments of the invention in which an exclusive property or privilege is claimed are defined as follows:

1. In a television receiver having first and second deflection coils for generating a raster, a first sweep circuit for supplying a first sweep signal for the first deflection coil, and a second sweep circuit for supplying a second sweep signal for the second deflection coil, a pincushion correction circuit, comprising:

a saturable transformer having a saturable magnetic core, a first winding means wound on the saturable core, and a second winding means wound on the saturable core;

a deflection circuit coupling the first sweep circuit to the first deflection coil through the first winding of the saturable transformer to pass a corrected first sweep signal to the first deflection coil;

an adjustable correction means for modulating the first sweep signal with a pincushion correction signal derived from the second sweep signal to develop the corrected first sweep signal, including drive means coupled to the second sweep circuit for causing correction current to flow in the second winding means of the saturable transformer, first and second diodes, first and second variable inductors, third winding means wound on the saturable core, a first circuit connecting the first diode and the first variable inductor to the third winding means for passing current during a start portion of the second sweep signal and with a variable magnitude controllable by the first variable inductor, and a second circuit connecting the second diode and the second variable inductor to the third winding means for passing current during an end portion of the second sweep signal and with a variable magnitude controllable by the second variable inductor, whereby the current in said second and third windings means provides separately controllable pincushion correction at the sides of the raster.

2. The pincushion correction circuit of claim 1 wherein the first circuit and the second circuit are connected in parallel and the first and second diodes are oppositely poled.

3. The pincushion correction circuit of claim 1 wherein the first and second variable inductors are mounted on a common coil form and have a movable common core.

4. The pincushion correction circuit of claim 1 wherein the first variable inductor includes a core movable to independently control the inductance of the first circuit, and the second variable inductor includes a core movable independent of the first core for independently varying the inductance of the second circuit.

5. The pincushion correction circuit of claim 1 wherein the second sweep circuit supplies a sawtooth signal corresponding to the second sweep signal, the drive means includes an integrator responsive to the sawtooth signal for deriving a generally parabolic correction current which flows in said second winding means.

6. The pincushion correction circuit of claim 5 wherein the integrator includes a transistor driver having a base and a pair of outputs, one output being coupled to the second winding means, an input circuit to the base including a capacitor for integrating the sawtooth signal and a variable resistor.

7. The pincushion correction circuit of claim 1 wherein the first circuit connects the first diode and the first variable inductor in series across the third winding means, the second circuit connects the second diode and the second inductor in series across the third winding means and in parallel with the first circuit, and the first and second diodes are oppositely poled.

8. The pincushion correction circuit of claim 1 for providing side pincushion correction which is separately adjustable at the right and left side of the raster, wherein the first sweep circuit supplies a horizontal sawtooth signal, corresponding to the first sweep signal, coupled to the horizontal deflection coil corresponding to the first deflection coil, the second sweep circuit supplies a vertical sawtooth signal, corresponding to the second sweep signal, coupled to the vertical deflection coil corresponding to the second deflection coil, said drive means includes an integrator responsive to the vertical sawtooth signal for producing a generally parabolic vertical current which flows in the second winding means of the saturable transformer, the first variable inductor and second variable inductor being controllable to vary the amount of pincushion correction at the sides of the raster.

9. In a television receiver having first and second deflection coils for generating a raster, a first sweep circuit for supplying a first sawtooth signal for the first deflection coil, and a second sweep circuit for supplying a second sawtooth signal for the second deflection coil, a pincushion correction circuit, comprising:

a saturable transformer having a saturable core and a first winding, a control winding and an equalizing winding each wound on the saturable core;

deflection means coupling the first sweep circuit to the first deflection coil through the first winding to pass a first sawtooth signal modulated with a generally parabolic correction signal having a rate corresponding to the second sawtooth signal;

adjustable correction means for modulating the first sawtooth signal with the generally parabolic correction signal derived from the second sawtooth signal, including an integrator coupled between the second sweep circuit and the control winding for causing a parabolic current to flow at a rate corresponding to the second sawtooth signal, a diode, a variable inductor, and circuit means connecting the diode and the variable inductor across the equalizing winding with the diode being poled to pass a portion of the parabolic correction current with an amplitude controlled by the variable inductor.

10. The pincushion correction circuit of claim 9 including a second diode, a second variable inductor, and second circuit means connecting the second diode and the second variable inductor across the equalizing winding, the second diode being poled oppositely to the first diode to pass a different portion of the parabolic correction current and with an amplitude controlled by the second variable inductor.

11. The pincushion correction circuit of claim 10 wherein the first and second variable inductors are mounted on a common coil form and have a common core movable to inversely vary the inductance thereof.

12. The pincushion correction circuit of claim 10 wherein the first variable inductor includes a first core movable to change the inductance thereof, the second variable inductor includes a second core movable to change the inductance thereof, the first and second core being movable to independently vary the beginning and end portions of the sweep.

* * * * *